Aug. 10, 1954

T. M. DAHM ET AL
ELECTRICAL ATTACHMENT OF TEMPERATURE
SENSING DEVICES AND THE LIKE
Filed April 19, 1951

2,686,244

INVENTORS
THOMAS M. DAHM
BY MELVIN F. GEORGE JR.
Agent

Patented Aug. 10, 1954

2,686,244

UNITED STATES PATENT OFFICE 2,686,244

ELECTRICAL ATTACHMENT OF TEMPERATURE SENSING DEVICES AND THE LIKE

Thomas M. Dahm, Pasadena, and Melvin F. George, Jr., Los Angeles, Calif., assignors to Lockheed Aircraft Corporation, Burbank, Calif.

Application April 19, 1951, Serial No. 221,896

14 Claims. (Cl. 201—63)

This invention relates to electrical temperature sensing devices and similar relatively small and delicate instrumentalities of this general nature, and relates more particularly to means for making electrical attachments to such instrumentalities and for protecting the same.

There are in rather widespread usage small and easily damaged devices to which electrical wires must be attached and which must be secured in place on or embodied in larger assemblies, mechanisms, etc. An example of such fragile devices are temperature sensing units in the form of semi-conductors comprised of small plates or discs of an alloy or oxide mixture whose electrical resistance has the exceptional ability to decrease rapidly with an increase in temperature. These devices or units, which are known in the industry as "Thermistors," and are manufactured by the General Electric Company and the Western Electric Company are provided on their flat parallel surfaces with very thin silver films bonded with the semi-conductive material. In the use of the semi-conductors a small electric current is passed through the disc from one flat surface to the other and the thin silver films have the important function of assuring the distribution of current over each entire surface or area of the disc. In preparing the sensing devices for use and installation it is necessary to secure wires to the silver films and in the past this has usually been accomplished by directly soldering the wires to the films. The soldering of the wires, which involves the tinning of the delicate silver films and the forming of the solder buttons for enclosing the ends of the wires, has been found to injure the bond to the Thermistor surfaces, rendering them unreliable in subsequent service. Thus a semi-conductor electrically connected in its circuit in the manner just described is frequently found to have an abnormally high electrical resistance for the temperatures to be encountered in the intended actual service. It is believed that such malfunctioning of the semi-conductors is caused by damage to the bonds between the silver films and the semi-conductive material thus reducing the effective electrode areas and/or by the absorption of the silver of the films into the solder buttons when the latter are in the liquid state during the soldering operations. The unreliability or malfunctioning of the semi-conductors frequently is not discovered until after the devices have been incorporated in costly assemblies.

It is an object of the present invention to provide simple, practical and effective electrical connections with semi-conductors, and other devices of this nature, that do not injure the devices in any way or impair their proper functioning. The invention provides electrical connections with the surface areas or electrodes of the semi-conductors that do not in any way disturb, reduce or break the bonds between the surface films of silver, or the like, and the material of the semi-conductor and that do not injure the films themselves.

Another object of the invention is to provide electrical connections of the character mentioned that develop or employ the full electrode surface areas of the device or semi-conductor. In accordance with the invention the bonds between the electrode surface films and the material of the semi-conductor remain complete and uninterrupted and there is full electrically conductive engagements or bonds with the outer surfaces of the films to assure proper conduction between these films and the wires or leads. This latter advantage is obtained by providing layers or bodies of electrically conductive material bonded directly to the outer surfaces of the silver films throughout their extents and embedding metal spirals, screens or plates to which the wires are in turn attached. The lead wires themselves are not soldered or otherwise directly attached to the thin silver films of the device and there is, therefore, no necessity for performing soldering operations on the delicate films. Instead the lead wires are soldered, welded, or otherwise appropriately connected to the grids or screens which are not even in direct physical contact with the films but are connected therewith through the medium of intervening conductive material, such as a conductive plastic or synthetic resin composition, bonded to the silver films and the grids or screens.

Another and important object of the invention is to provide an electrical attachment means of the character mentioned in which the semi-conductor, or the like, and its electrical attachment elements are supported and protected in such a manner as to dependably withstand the various mechanical stresses associated with its installation or other structure and with normal service wear and tear, to withstand the thermal stresses resulting from rapidly changing ambient temperatures over a wide range, to withstand high electrical potential differentials between the assembly and nearby conductors, and to resist the action of solvents, chemicals, etc. In accordance with the invention the semi-conductor or other electrical sensing device, its spaced adjacent grids or screens to which the lead-in wires are attached and the conductive plastic material bonding the latter to the former, are all enclosed in a rigid protective sheath of chemical resistant plastic that is a good dielectric and that effectively mechanically shields the device or assembly.

A further object of the invention is to provide an arrangement or assembly of the character referred to that is small, compact and light in weight.

Other objectives and features of the invention will become apparent from the following detailed description of several typical forms and applications throughout which description reference will be had to the accompanying drawings wherein.

Figures 1, 2, 3, 4, 5, 6, 7:
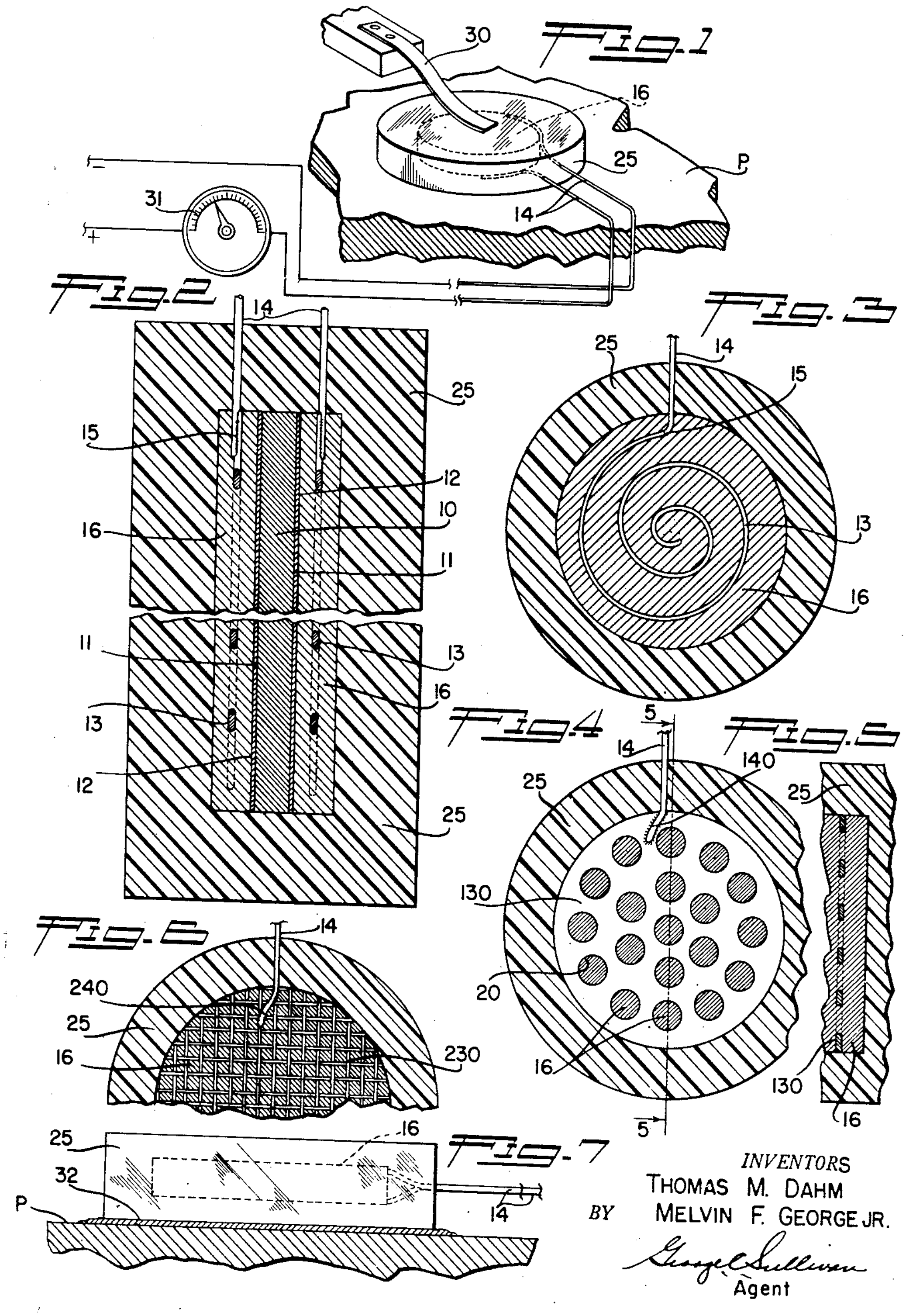
Figure 1 is a fragmentary perspective view illustrating a device or assembly of the invention arranged on a part or structure and electrically connected with an indicating meter.
Figure 2 is a greatly enlarged detailed sectional view of the device shown in Figure 1.
Figure 3 is an enlarged transverse sectional view taken in the plane of one of the screens or grids showing the latter in elevation.
Figure 4 is a view similar to Figure 3 illustrating another type or form of screen of the invention.
Figure 5 is a fragmentary transverse sectional view taken as indicated by line 5—5 on Figure 4.
Figure 6 is a fragmentary view similar to Figure 3 illustrating still another form of grid or screen of the invention.
Figure 7 is an edge or side elevation of one of the devices or units of the invention illustrating another mode of attachment.

While the invention is herein described in connection with the typical applications illustrated in the drawings, it is to be understood that it is not to be construed as limited to the particular structures shown or for use with semi-conducting heat sensing devices. It will be apparent that the principles of the invention are capable of employment in other situations and with other electrical sensing devices and the like. Referring now to Figures 1, 2 and 3, the sensing device or semi-conductor is in the form of a disc shaped unit 10 having a circular or cylindrical periphery and flat parallel sides 11. It may be assumed that the device 10 is a Thermistor, such as above referred to, formed of caesium and rare earth oxides, the material of the unit being such that its electrical resistance increases rapidly with a decrease in temperature. The surfaces 11 of the unit 10 are provided with adherent bonded films 12 of silver to form the electrodes, there being a small electric current passing through the unit 10 from one parallel side surface to the other during normal service operation of the unit. The films 10 are very thin and delicate, being exaggerated in thickness in the drawings for the sake of clarity and are well bonded to the material of the sensing unit 10. The unit 10, as just described, is usually both small in size and easily damaged, being quite fragile, particularly in flexure.

The invention provides a grid or screen 13 adjacent each side surface film 12 of the unit 10. The screens 13 are in spaced parallel relation to their respective surfaces or films 12. As illustrated in Figures 2 and 3, the screens 13 are wires of spiral shape, the outer convolutions being somewhat smaller in diameter than the unit 10 and the wires terminating adjacent the central axis of the assembly. The wires constituting the screens 13 may be flattened, as best illustrated in Figure 2 to present broad surfaces facing their respective films 12. Each screen 13 has a conductor or wire 14 which may be integral therewith or which is soldered, brazed, welded or otherwise connected to its outer end at 15. While we have shown the screens 13 in the form of flattened spiral wires to obtain more effective current distribution to the films 12 of the unit 10, it is to be understood that in some applications the wires of the screens may be straight and/or may be round in cross section.

The invention provides a novel and particularly effective manner of securing and electrically associating the screens 13 with their respective electrode films 12 of the sensing unit 10. Each grid or screen 13 is cast, enclosed or embedded in a body or layer 16 of rigid adherent electrically conductive material. These bodies or layers 16 are bonded to the silver films 12 of the temperature sensing unit 10. It is preferred that the conductive layers 16 be self-bonded to both the screens 13 and the films 12, that is, it is preferred to have the material of the layers 16 directly bond and adhere to the screens and films without the use of intervening or intermediate cement or the like. This, of course, may be accomplished by casting, pressure molding, brushing, dipping, or otherwise applying the material of the layers 16 to the films 12 with the screens 13 embedded in the blocks or layers thus formed. The layers 16 are composed of an electrical conductive material or materials; for example, we have found it practical to form the layers 16 of finely divided silver, such as silver leafing powder, dispersed in a film forming thermo-setting liquid solution such as a vinyl type resin with a thermo-setting additive such as a reactive phenolic resin or in an epoxyline resin or in other adherent thermo-setting resin, with a suitable solvent. The leafing powder may be employed in the proportion of from 10 to 80 parts by weight for each 100 parts by weight of the resin solution. The solvent used with the vinyl type resins may be cyclohexanone, or the like, while aromatic hydrocarbon solvents may be used with the epoxyline resins. While the present invention is not primarily concerned with the method or procedure employed, it will usually be found desirable to thoroughly clean and degrease the electrode films 12 and the screens 13 for the reception of the liquid conductive material constituting the layers 16. In this regard, the important consideration is the direct bonding or adherence of a selected or suitable conductive material to each electrode film 12 and its adjacent screen 13 and it is of course desirable to locate or orient the screens 13 in the layers 16 to be substantially equally spaced from the sides of the unit 10 and to be substantially parallel with the films 12.

It is to be observed that the association or attachment of the screens 13 to the sensing unit 10 is obtained without the application of solder to the delicate films 12 and without resort to other procedures or arrangements that might injure the films. The conductive layers 16 preferably have sufficient thickness to completely enclose the screens 13 and, as best illustrated in Figure 2, the screens may occupy medial planes substantially midway between the adjacent electrode films 12 and the outer sides or surfaces of the layers. The peripheries of the conductive bodies or layers 16 may be concentric with and flush with the periphery of the temperature sensing unit 10. The connections 15 between the wires 14 and their screens 13, when employed, may be enclosed in the plastic conductive layers 16. Where the screens 13 are in the nature of spiral wires, as shown in Figures 2 and 3, the portions of the bodies or layers 16 at each side of the screens are of course integrally joined throughout by reason of the large areas between adjacent convolutions of the screens permitting free solvent release and substantially uniform setting and curing of the conductive plastic material.

Figures 4 and 5, and Figure 6, illustrate other typical forms or types of secondary electrodes or screens of the invention. In these figures, the unit 10 and the layers 16 of conductive adherent material may be the same as above described. In Figures 4 and 5, the screens 130 are in the nature of relatively thin perforated metal plates welded, brazed, or soldered to the lead wires 14 at 140. In practice, the plates or screens 130 may be formed of shim stock provided with multiplicities of spaced perforations 20 to permit the substantially uniform solvent release, setting and curing of the plastic layer portions at the inner and outer sides of the screens. The screens 130 are in spaced parallel relation to their adjacent electrode films 12 and are substantially midway between the inner and outer sides of the layers 16 with their peripheries flush with the peripheries of the layers. In Figure 6 the screen 230, corresponding in function and location with the above described screens 13, is a disc of metal mesh or screening with its respective lead-in wire 14 secured thereto at 240 by soldering, brazing, or welding.

The assembly as described in detail above is capable of service or use if suitably enclosed in an electrically insulated metal housing or the like. However, the invention provides a protective and insulating envelope 25 for the assembly. The envelope 25 is preferably, though not necessarily, formed of a suitable casting resin such as a styrene-unsaturated polyester resin, a thermosetting phenolic resin, or the like. The envelope 25 may be cast around the device or assembly to completely enclose the same, as illustrated in the drawings. While the envelope 25 may have any selected or required external configuration, we have shown it in disc form having flat parallel ends and a cylindrical periphery. Portions of the wires 14 are cast or embedded in the material of the envelope 25. The material of the envelope 25 is directly bonded to the periphery of the sensing unit 10 and to the peripheries and outer sides of the conductive material layers 16. The envelope 25 is composed of a dielectric material and thus forms a complete insulating shield or covering for the sensing assembly. Furthermore, the walls of the envelope 25 may be relatively thick, strong, and rigid to adequately protect the assembly against the stresses and wear and tear to which it is subjected during attachment to structure, or the like, while being installed and during actual service of the assembly. It is to be observed that the rather delicate sensing unit 10 and its thin electrode films 12 are fully enclosed and protected within the sheath or envelope 25.

The device constructed as above described may be installed or secured in its operative service position in any selected or required manner and its sensing unit 10 may be connected in any appropriate indicating and/or recording electrical circuit. In Figure 1, we have shown a device of the invention arranged on the surface of a part P whose temperature is to be sensed for control purposes, or the like, and we have shown a spring 30 for retaining the device in the operative position. The wires 14 are connected in or form parts of a circuit carrying a small current for passage through the sensing device 10 and a resistance indicating device, such as a milliammeter 31 is interposed in this circuit. As previously pointed out, the material of the unit 10 is such that its electrical resistance is rapidly changed upon a variation or change in the environmental temperature and these changes in resistance are reflected or indicated by the meter 31. It is to be understood that the association of the device with such a meter is merely one manner of employing the device and in other cases it may be found preferable to employ the device as one arm of a Wheatstone bridge circuit. The silver films 12 are designed to provide for a uniform distribution of the electric current through the area of the sensing unit 10 as will be readily apparent and the screens or secondary electrodes 13 of the invention connected with the wires 14 and embedded in the conductive material layers 16 which, in turn, are bonded to the films 12, assure a substantially uniform distribution of current to the films 12. Thus the invention promotes the most efficient operation of the sensing device 10.

As above described, the device of the invention may be installed and employed in various manners depending upon the intended conditions of operation. For example, it may be installed in the interior of a laminated glass windshield or in a flexible wired heating blanket, in which case it is not only subjected to mechanical stresses during installation but also to repeated flexural stresses during normal service. These stresses in the past have often caused fracture of the fragile sensing unit 10 and/or detachment of the soldered-on wires. With the construction of the invention the semi-conductive unit 10 is fully protected against such wear and tear and fatigue as are the attachments of the wires 14 with the secondary electrodes or screens 13, the enclosing envelope 25 and the plastic layers 16 providing complete protection. Figure 7 illustrates an installation where the envelope 25 of the device is directly secured to the part P by cement 32, this merely being another mode of attaching or employing the device.

Having described only typical preferred embodiments and applications of the invention, we do not wish to be limited to the specific details set forth, but wish to reserve to ourselves any features or modifications that may fall within the scope of the claims.

We claim as our invention:

1. In combination with an electrical circuit; a pair of spaced electrodes connected in the circuit, a temperature sensing unit spaced between the electrodes and presenting two electrode surfaces, one in spaced relation to one electrode, the other in spaced relation to the other electrode, a fragile metal film on each of said surfaces, and a layer of electrically conductive plastic bonded with each electrode and the film in spaced relation thereto to provide a conductive path therebetween and to attach the electrodes to said unit.

2. In combination with an electrical circuit; a pair of spaced electrodes connected in the circuit; a temperature sensing unit spaced between the electrodes and presenting two electrode surfaces, one in spaced relation to one electrode, the other in spaced relation to the other electrode, a fragile metal film on each of said surfaces, and a layer of electrically conductive plastic bonded with each electrode and the said film in spaced relation thereto to provide a conductive path therebetween and to attach the electrodes to said unit, said layers encasing the electrodes.

3. A device of the class described comprising a pair of spaced electrode screens, a semi-conductive temperature sensing unit spaced between the screens, the unit presenting a surface in spaced opposing generally parallel relation to each screen, a fragile metal film bonded on each surface, a layer of electrically conductive plastic encasing each screen and adhering to the film of the related spaced opposing surface to secure the screens to the unit and to constitute current paths between the screens and the films, and a protective envelope for said unit and layers.

4. A device of the class described comprising a pair of spaced electrode screens, a semi-conductive temperature sensing unit spaced between the screens, the unit presenting a surface in spaced opposing generally parallel relation to each screen, a metal film bonded on each surface, a layer of electrically conductive plastic encasing each screen and adhering to the film of the spaced opposing surface to secure the screens to the unit and to constitute current paths between the screens and the films, and a protective dielectric plastic envelope encasing said unit and layers.

5. A device of the character described including a pair of spaced generally parallel electrode screens each including a spiral of conductive wire, an electrical sensing unit spaced between the screens, the unit presenting a surface opposing one screen and a surface opposing the other screen, and a layer of electrically conductive plastic encasing each screen and bonded to said surface opposing the same, said layers securing the screens to the unit and providing current distributing electrical paths between the screens and said surfaces.

6. In combination with an electrical circuit; a pair of spaced generally parallel electrode screens connected in the circuit and each including a perforated sheet, an electrical sensing unit spaced between the screens, the unit presenting an electrode surface opposing one screen and an electrode surface opposing the other screen, a fragile metal film on each of said surfaces, and a layer of electrically conductive plastic encasing each screen and bonded to said film opposing the same, said layers securing the screens to the unit and providing current distributing electrical paths between the screens and said films.

7. In combination with an electrical circuit; a pair of spaced generally parallel electrode screens connected in the circuit and each including a woven wire disc, an electrical sensing unit spaced between the screens, the unit presenting a surface opposing one screen and a surface opposing the other screen, a fragile metal film on each of said surfaces, and a layer of electrically conductive plastic encasing each screen and bonded to said film opposing the same, said layers securing the screens to the unit and providing current distributing electrical paths between the screens and said films.

8. A device of the character described including a pair of spaced generally parallel electrode screens each including a spiral of conductive wire, an electrical sensing unit spaced between the screens, the unit presenting a surface opposing one screen and a surface opposing the other screen, and a layer of electrically conductive plastic encasing each screen and bonded to said surface opposing the same, said layers securing the screens to the unit and providing current distributing electrical paths between the screens and said surfaces, and an envelope of rigid dielectric plastic encasing and bonded to said unit and layers.

9. In a device of the class described; the combination of a sensing unit presenting an electrode surface, a fragile silver film on said surface, an electrode spaced from the surface, and a body of electrically conductive plastic between and directly adhering to said film and to said electrode to electrically connect the same.

10. In a device of the class described; the combination of a sensing unit presenting an electrode surface, an electrode spaced from the surface, a conductive wire joined with the electrode, and a body of electrically conductive plastic directly adhering to said surface and encasing and directly adhering to the electrode to secure the electrode to the unit and to electrically connect said surface and electrode.

11. In a device of the class described; the combination of a sensing unit presenting an electrode surface, an electrode spaced from the surface, a conductive wire joined with the electrode, a body of electrically conductive plastic directly adhering to said surface and encasing and directly adhering to the electrode to secure the electrode to the unit and to electrically connect said surface and electrode, and an envelope of dielectric plastic encasing said unit and body and directly adhering thereto.

12. In combination; a semi-conductor present- two opposite side surfaces, a fragile electrode film on each of said surfaces of the conductor, a first conductive screen spaced from one film, a second conductive screen spaced from the other film, a first body of electrically conductive material between and directly bonded to said first screen and said one film to electrically connect the same, and a second body of electrically conductive material between and directly bonded to said second screen and said other film, to electrically connect the same.

13. In a device of the character described; an electrical circuit, two spaced electrodes in the circuit, a temperature sensing unit comprising a body of semi-conductive material having a first electrode surface spaced from one of said electrodes and a second electrode surface spaced from the other of said electrodes, a layer of electrically conductive material between and directly adhering to said first electrode and said one electrode surface to mechanically and electrically connect the same, and a second layer of electrically conductive material between and directly adhering to said other electrode and said second electrode surface to mechanically and electrically connect the same.

14. In a device of the character described; the combination of an electrical circuit, electrodes in the circuit spaced one from the other in generally parallel relation, a sensing unit spaced between the spaced electrodes and presenting a first surface in spaced opposing generally parallel relation to one of said electrodes and a second surface in spaced opposing generally parallel relation to the other electrode, an electrically conductive plastic body between and directly adhering to said first surface and said one of the electrodes to provide a conductive path therebetween, and an electrically conductive body between and directly adhering to said second surface and said other electrode to constitute a conductive path therebetween.

References Cited in the file of this patent

UNITED STATES PATENTS

| Number | Name | Date |
|---|---|---|
| 1,807,326 | Ruben | May 26, 1931 |
| 1,963,554 | McDill | June 19, 1934 |
| 2,248,985 | Gray | July 15, 1941 |
| 2,434,560 | Gunter | Jan. 13, 1948 |
| 2,464,568 | Flynn et al. | Mar. 15, 1949 |

FOREIGN PATENTS

| Number | Country | Date |
|---|---|---|
| 415,497 | Great Britain | Mar. 17, 1933 |
| 796,138 | France | Jan. 17, 1936 |